United States Patent [19]

Bormioli

[11] Patent Number: 4,652,016
[45] Date of Patent: Mar. 24, 1987

[54] HIGH PRESSURE PIPE UNION DESIGNED TO DISENGAGE AUTOMATICALLY UNDER SEVERE PULLING STRESS

[76] Inventor: Giorgio Bormioli, Via Galileo Galilei, 11, 35100 Padova, Italy

[21] Appl. No.: 783,190

[22] Filed: Oct. 2, 1985

[30] Foreign Application Priority Data

Nov. 29, 1984 [IT] Italy .............................. 23790 A/84

[51] Int. Cl.$^4$ .............................................. F16L 37/00
[52] U.S. Cl. ......................................... 285/2; 285/3; 285/18; 285/306; 285/316
[58] Field of Search ...................... 285/2, 1, 3, 4, 18, 285/102, 316, 83, 306, 317

[56] References Cited

U.S. PATENT DOCUMENTS

| | | | |
|---|---|---|---|
| 3,042,068 | 7/1962 | Smith | 285/4 |
| 3,383,123 | 5/1968 | Murray | 285/83 |
| 3,653,405 | 4/1972 | Nelson | 285/1 |
| 3,841,665 | 10/1974 | Capot | 285/2 |
| 4,124,228 | 11/1978 | Morrison | 285/1 |
| 4,348,039 | 9/1982 | Miller | 285/1 |
| 4,351,351 | 9/1982 | Flory et al. | 285/2 |
| 4,361,165 | 11/1982 | Flory | 285/2 |
| 4,424,988 | 1/1984 | Cowx | 285/2 |
| 4,431,215 | 2/1984 | Moyer | 285/18 |
| 4,491,345 | 1/1985 | Regan | 285/18 |
| 4,577,833 | 3/1986 | Bormioli | 251/149.1 |

FOREIGN PATENT DOCUMENTS 2317614 10/1974 Fed. Rep. of Germany ... 285/DIG. 1

Primary Examiner—Richard J. Scanlan, Jr.
Assistant Examiner—Eric K. Nicholson
Attorney, Agent, or Firm—Shlesinger, Fitzsimmons & Shlesinger

[57] ABSTRACT

The union is made up of two parts normally locked together by at least one radial screw with sized cross section. Under severe pulling stress applied to the union from the outside the locking screw breaks and frees the two parts of the union, which separate together with the pipes to which they are attached. Under normal working conditions elastically stressed sealing devices ensure maintenance of watertightness between the union parts.

5 Claims, 2 Drawing Figures

HIGH PRESSURE PIPE UNION DESIGNED TO DISENGAGE AUTOMATICALLY UNDER SEVERE PULLING STRESS

The present invention relates to a high pressure pipe union designed to disengage automatically under severe pulling stress.

Pipe unions are usually employed in the petroleum industry to make temporary connections between pipes arriving from positions in movement relative to each other such as for example an underwater delivery output and a cargo ship.

An important requirement for such unions in addition to the requirement for assuring the best possible seal in the connecting section is to allow automatic separation of the two pipes immediately upon the application of a pulling stress due for example to rough sea or engagement with a moving anchor, greater than an acceptable maximum value, regardless of the stress normally exerted by pressure of the petroleum product being conveyed.

Unions suitable for said purpose are already known such as for example the one described in U.S. Pat. No. 4,577,833 filed by the applicant hereof. They are based on mutually engaged union parts and release systems for said parts which in case of weak pulling stresses of external origin allow limited mutual axial movement of the two union parts without separating them whereas under stresses higher than the predetermined limit they extend said movement until achievement of complete separation of the two parts and the resulting separation of the coupled pipes.

Solutions of this type are quite usable as long as it is possible to use flexible and elastically deformable elastomer seals for watertightness between the members in movement. But they cannot be used when for very high pressure operations the rubber seals must be replaced by metal ones which are rigid and only deformable permanently and therefore not suited to withstand even limited elongation and reclosing movements of the union.

The object of the present invention is to achieve a union for pipes operating at high pressure and therefore fitted with metal seals which would be capable of withstanding the normal stresses due to working pressure and at the same time capable of effecting automatically separation of the connected pipes in case of pulling stresses of external origin higher than a predetermined maximum value.

In accordance with the invention said object has been achieved by a pipe union comprising a first and a second union part fixable to a first and second pipe respectively and traversed by aligned axial passages for a fluid product to be conveyed and devices for mutual coupling of said union parts characterized in that said coupling devices include rigid locking devices having predetermined breaking strength capable of keeping said union parts united until pulling stresses greater than said breaking strength occur and elastically stressed watertight coupling devices capable of holding said union parts engaged in a watertight manner until breakage of said rigid locking devices.

In other words the present invention provides two different coupling systems working together, operationally in parallel, to ensure the desired watertightness and consequently compensation for the pressure of the fluid under working conditions and also when idle and to ensure at the same time rigid connection of the two parts of the union until complete separation of said parts under abnormal and dangerous external pulling stresses.

The rigid locking devices consist specifically of at least one locking screw with sized cross section arranged radially to connect coaxial portions of the two parts of the union.

The watertight elastically stressed joining devices include specifically a plurality of cylindical chambers arranged parallel to the axis of the union and each having a first terminal wall integral with one of said union parts and a second terminal wall which is axially movable and normally engaged with the other of said union parts but automatically releasable from it in case of mutual axial movement of the two union parts, a sliding piston housed in each chamber and having an internal recess communicating with said aligned axial passages through a small channel passing through said first terminal wall of the chamber, a small piston housed in a sliding manner in said piston recess and fitted with a stem rigidly fixed to said second terminal wall of the chamber, and preloaded elastic devices interposed between said piston and said terminal wall of said chamber to hold said piston against said first terminal wall of said chamber.

These and other characteristics of the present invention will be made clear by the following detailed description of a practical embodiment thereof illustrated as a nonlimiting example in the annexed drawings wherein.

Figure 1:
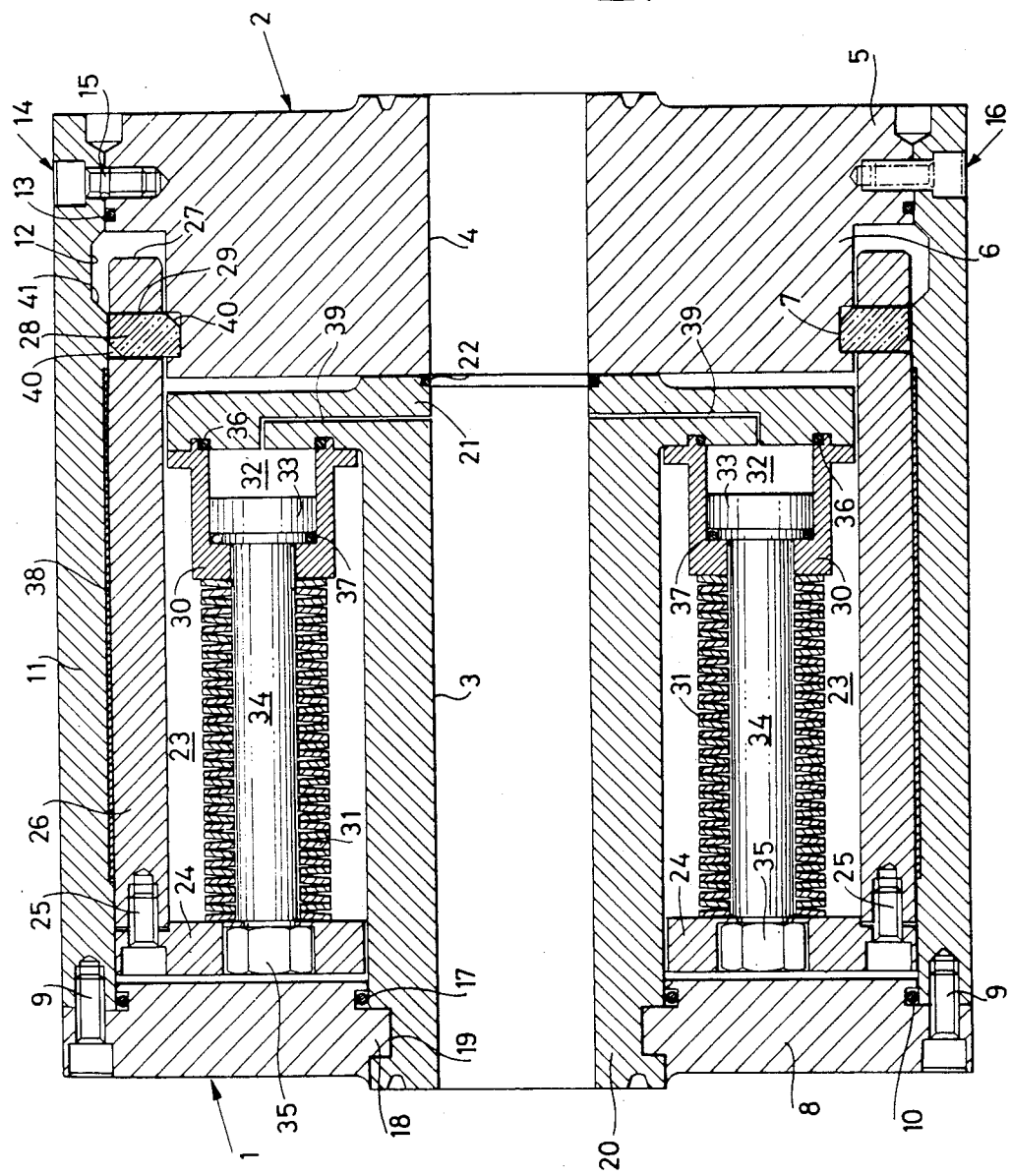
FIG. 1 shows a union according to the invention in axial cross section under normal working conditions.

With reference to FIG. 1 a pipe union is shown therein which comprises a first and a second part of a union 1 and 2 fixable with screws or other known devices to a first and a second pipe respectively and traversed by aligned axial passages 3 and 4.

The union part 2 is made up of a portion of larger diameter 5 and a portion of smaller diameter 6 provided with a peripheral distribution of radial notches 7.

The union part 1 comprises a terminal plate 8 to the periphery of which is secured with screws 9 with interposed metal seal 10 a cylindrical wall 11 provided internally with a peripheral distribution of recessed seats 12. In said cylindrical wall 11 is received the union part 2 whose major diameter portion 5 couples with said wall with an interposed metal seal 13 and is secured thereto by a plurality of locking screws 14 having predetermined breaking strength arranged radially and provided with a sized cross section 15 calculated to resist breakage up to a predetermined shearing stress. Another plurality of radial screws 16 calibrated for a higher stress is provided for a stronger lock during transportation and assembly of the union but said screws are designed to be removed during normal employment of the union. A simplified example of such a screw is indicated in dot and dash lines in FIG. 1.

In the terminal plate 8 of the union part 1 with interposition of a metal seal 17 is arranged and locked by protuberances 18 in recesses 19 a cylindrical hub 20 which, in combination with a terminal flange 21 thereof butted against the front portion of smaller diameter 6 of the union part 2 with interposed metal seal 22, describes a peripheral distribution of cylindrical chambers 23 arranged parallel with the common axis of the aligned passages 3 and 4, i.e. with the axis of the union.

Each chamber 23 has a first fixed terminal wall consisting of a corresponding portion of the flange 21 and a second movable terminal wall 24 secured with screws 25 and a cylindrical sleeve 26 which acts as a side wall for the chambers 23 and is inserted in a sliding manner with an intermediate sliding sheath 38 in said cylindrical wall 11 of the union part 1. A protuberant portion 27 of the sleeve 26 is placed around the portion with smaller diameter 6 of the union part 2 and has radial windows 29 in which are inserted in a sliding manner pawls 28 which may be engaged alternatively in the radial notches 7 of the union part 2 or in the recessed seats 12 of the union part 1 for engagement of the sleeve 26 and hence of the movable wall 24 with the union part 2 or for release thereof therefrom respectively.

In each chamber 23 is housed in a sliding manner a piston 30 which an assembly of preloaded springs 31 reacting between said piston 30 and the movable wall 24 thrusts against the flange 21 with which it forms a seal with the aid of a metal seal 36. Inside the piston 30 is also described a sliding recess 32 for a small piston 33 with associated metal seal 37 the stem 34 of which extends from said piston 30 and terminates fixed to the terminal wall 24 by a nut 35. The stem 34 acts as a support and guide for the assembly of preloaded springs 31. A channel 39 provides communication with the axial passage 3 for each of the said recesses 32 in the part behind the piston 33.

During transportation and assembly of the union as mentioned above the two union parts 1 and 2 are held together by the locking screws with predetermined breaking strength and by other screws 16 having higher breaking strength. After transportation and assembly the aforesaid screws 16 are removed leaving only the calibrated screws 14 to maintain rigid connection of the two parts of the union.

After installation of the union but while it is still idle the Belleville washers 31 act on the hollow pistons 30 in such a manner as to push them against the terminal flange 21 of the union part 1 and thus keep said flange engaged as a seal against the smaller diameter part 6 of the union part 2 with the aid of the metal seal 22. The preloaded springs 31 act against the walls 24 which are held coupled to the union part 2 by engagement as illustrated in FIG. 1 of the pawls 28 in the radial notches 7 of the union part 2.

Under working conditions, i.e. with fluid under pressure fed along the aligned axial passages 3 and 4, said fluid fills the internal recesses 32 of the pistons 30 through the small channels 39 creating in said recesses a pressure such as to further thrust the flange 21 of the union part 1 against the facing wall of the union part 2. Sealing pressure depends on the pressure of the conveyed fluid and hence increases proportionately to the increase in the separation thrust exerted by said fluid within the cooperating walls 21 and 6.

The desired watertightness between the two parts of the union is thus ensured both when at rest and during work.

Figure 2:
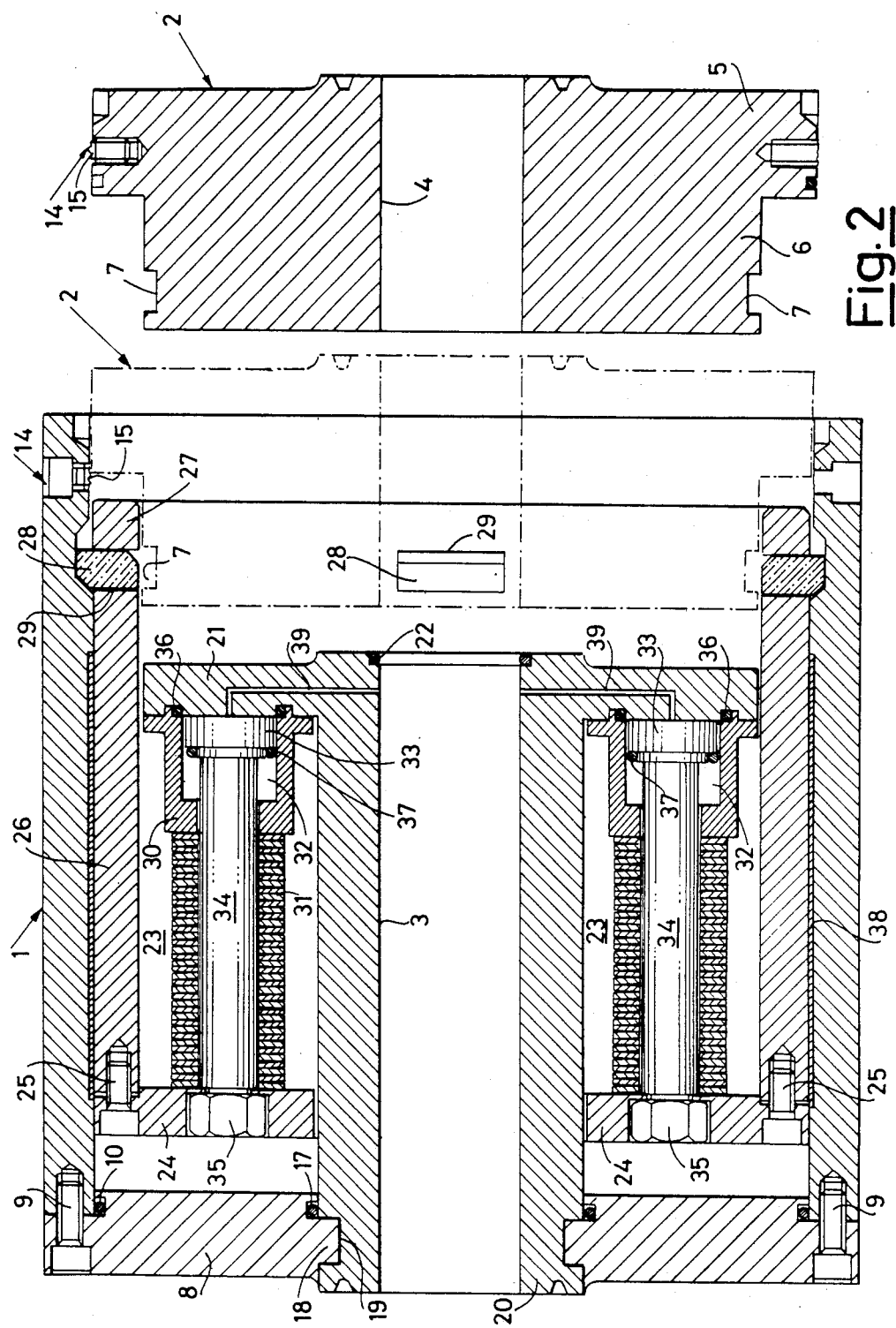
FIG. 2 shows the same union released.

The described state changes only in case of external pulling stress exerted on the union. In such a case, when the stress is great enough to overcome the breaking strength of the sized screws 14 together with the force of the springs 31 the screws 14 break, allowing the cylindrical wall 11 to slide axially with respect to the union part 2, taking with it the terminal plate 8, the cylindrical hub 10, and the flange 21. Said movement is allowed by sliding of the hollow pistons 30 on the small pistons 33 and on their stems 34 resisted by the preloaded springs 31 while the walls 24 of the chambers 23 remained engaged with the union part 2 by the pawls 28. Immediately thereafter the pawls 28 are reached by the recessed seats 12 wherein they are forced to insert themselves by cooperating bevels 40 and 41, thus freeing the union part 2 from its engagement with the walls 24 and hence with the union part 1. The union part 2, which at that moment is in the position illustrated in dot and dash lines in FIG. 2, then disengages completely from the union part 1, drawing away therefrom as shown in solid lines in FIG. 2.

I claim:

1. Union for pipes operating at very high pressures comprising first and second union parts each being fixable to a first and a second pipe, respectively, and being traversed by aligned axial passages for a fluid product to be conveyed therethrough, and mutual coupling devices for said union parts characterized in that said coupling devices comprise a rigid locking device securing said parts together and having a predetermined breaking strength designed to hold said union parts together until application on said union parts of pulling stresses greater than said breaking strength, and elastically stressed watertight means joining said coupling devices and releasably designed to keep a pair of confronting surfaces of said union parts engaged in a watertight manner until breakage of said rigid locking devices, said watertight means comprising a plurality of cylindrical chambers arranged parallel to the axis of the union, and each having a first terminal wall integral with one of said union parts and a second terminal wall which is axially movable and normally engaged with the other of said union parts but automatically releasable therefrom in case of mutual axial movement of the union parts, a first piston housed in a sliding manner in each chamber and having an internal recess in communication with said aligned axial passages through a channel passing through said first terminal wall of said chamber, a second piston housed in a sliding manner in said internal recess and fitted with a stem fixed rigidly to said second terminal wall of said chamber, and preloaded elastic devices in each chamber interposed between said first piston and said second terminal wall of the chamber to hold said first piston against said first terminal wall of said chamber.

2. Union according to claim 1 characterized in that said rigid locking device comprises at least one locking screw of sized cross section arranged radially for connecting coaxial portions of the two union parts.

3. Union in accordance with claim 1 characterized in that said elastic devices comprises preloaded springs mounted on and guided by said stems.

4. Union in accordance with claim 1 characterized in that said second terminal wall of each chamber is fixed to a cylindrical sleeve which acts as a side wall of said chambers and has a protuberant portion interposed between mutually engaged coaxial portions of said union parts, said protuberant portion being fitted with devices for releasable engagement with said other union part.

5. Union in accordance with claim 4 characterized in that said engagement devices comprise a plurality of pawls housed in a sliding manner in radial windows of said protuberant portion of the cylindrical sleeve in order to engage with radial notches in one of said coaxial portions of said union parts for the purpose of releasably engaging said cylindrical sleeve with said other union part.

* * * * *